3,041,173
COMPOSITION AND METHOD FOR PROMOTING THE GROWTH AND FEED UTILIZATION OF MEAT-PRODUCING RUMINANTS

Wise Burroughs, Ames, Iowa, and Thomas M. Means, Cumberland, Ind., assignors of one-half each to Iowa State College Research Foundation, Ames, Iowa, a corporation of Iowa, and Eli Lilly and Company, Indianapolis, Ind., a corporation of Indiana
No Drawing. Filed Feb. 17, 1959, Ser. No. 793,668
6 Claims. (Cl. 99—2)

This invention relates to a composition and method for promoting the growth and feed utilization of meat-producing ruminants. The invention is applicable to both beef cattle and sheep which are the principal meat-producing ruminants in the United States.

Patent 2,751,303 describes a method of raising beef cattle and sheep which has gone into widespread commercial use. In this method, an estrogenic substance, such as diethylstilbestrol, is fed to the growing ruminants on a regular daily basis, and the feeding is continued over an extended period of time, the quantity of the estrogenic substance fed to the ruminants being regulated to accelerate the rates of weight gain of the animals without appreciably affecting their reproductive systems. By this procedure more beef and sheep meat can be produced in the same time with a reduced amount of feed without impairing the quality of the meat.

From the physiological standpoint the administration of estrogens to beef cattle and sheep as described in Patent 2,751,303 tends to produce primarily a growth response as distinguished from a fattening response. It is well understood in animal nutrition that a growth response is characterized by an increased rate of weight gain and by an increased feed efficiency, whereas a fattening response is characterized by a reduced growth rate and is almost invariably accompanied by a decrease in feed efficiency. This does not mean of course that some fattening may not occur concomitantly with a growth response. In practical application, however, there is a basic difference between a growth promotant, such as diethylstilbestrol when employed according to the method of Patent 2,751,303, and a fattening agent, such as thiourea and thiouracil when used according to the method described in Turner and Reineke Patent 2,438,353.

The principal object of the present invention is to provide a composition and method for promoting the growth and feed utilization of meat-producing ruminants such as beef cattle and sheep. A more specific object is to provide a composition and method of the character described wherein an estrogenic substance like diethylstilbestrol is combined with and used in combination with another substance which enhances the growth response obtainable with the estrogenic substance alone. Further objects and advantages will become apparent in the following discussion of the present invention.

The method of this invention can be advantageously practiced by employing a composition containing in combination an estrogenic substance and a 2-mercaptoimidazole compound. The weight ratio of the estrogenic substance and the 2-mercaptoimidazole compound should be such that there are from 10 to 100 weight units of the 2-mercaptoimidazole compound per each part of the estrogenic substance corresponding in estrogenic activity to 1 weight unit of diethylstilbestrol. For example, the composition could contain 50 milligrams of the 2-mercaptoimidazole compound per each milligram of diethylstilbestrol.

The estrogenic substances which may be employed in practicing the present invention are the same as those described in Patent 2,751,303, diethylstilbestrol or other synthetic estrogen being preferred. Furthermore, the estrogenic substance is to be employed according to the method and subject to the dosage limitations set forth in said prior patent. For purpose of conciseness therefore the disclosure of Patent 2,751,303 is incorporated herein by reference.

The 2-mercaptoimidazole compound can be selected from the group consisting of 2-mercaptoimidazole and 1-alkyl-2-mercaptoimidazoles wherein the alkyl group contains from 1 to 5 carbon atoms. One preferred compound is 1-methyl-2-mercaptoimidazole. Other compounds having similar properties when employed for the purpose of the present invention are 2-mercaptoimidazole, 1-ethyl-2-mercaptoimidazole, 1-propyl-2-mercaptoimidazole, 1-butyl-2-mercaptoimidazole and 1-isopentyl-2-mercaptoimidazole. In one preferred embodiment, diethylstilbestrol is combined with 1-methyl-2-mercaptoimidazole.

In the commercial application of the feeding method described in Patent 2,751,303 it has been found to be quite satisfactory to feed beef cattle ranging from 600 to 1200 pounds in weight approximately 10 milligrams of diethylstilbestrol per day. Worthwhile results may be obtained over feeding periods of as short as 30 to 60 days, or the feeding of the estrogenic substance can be continued for much longer periods, for example, 100 to 150 days. Lambs are usually fed for shorter periods of time, for example for around 60 to 90 days. Satisfactory results are obtained where lambs weighing from 65 to 100 pounds receive about 2.0 milligrams of diethylstilbestrol per day.

The major benefits of the method of the present invention are achieved over feeding periods ranging from 30 to 90 days. The most pronounced enhancement of the estrogenic growth response occurs during the first 30 days of the combined feeding of the estrogen and the 2-mercaptoimidazole compound, and there will usually not be any great advantage to extending the combined feeding beyond 90 days. The method is therefore particularly adapted for use in the final months of feeding of beef cattle prior to marketing. For example, the beef cattle can be fed a finishing ration for the last 60 days before marketing which contains both the estrogenic substance and the 2-mercaptoimidazole compound, the quantities thereof being controlled so that each animal receives approximately 10 milligrams of the estrogenic substance per day and about 500 milligrams per day of the 2-mercaptoimidazole compound. Since sheep are normally fed a prepared ration on a shorter term basis, the method can advantageously be applied over the entire period in which sheep are normally fed.

When beef cattle and sheep are being fed a sufficient amount of diethylstilbestrol (or other estrogenic substance) to obtain a substantially maximal growth response, it is preferred to also feed the animal from 10 to 100 parts by weight of the 2-mercaptoimidazole compound where the quantity of the stilbestrol is taken as 1 part by weight. For example, where the ration contains one milligram of diethylstilbestrol per 100 pounds of body weight per day, there would also be incorporated from 10 to 100 milligrams of the 2-mercaptoimidazole compound per 100 pounds of body weight per day. In practicing the present invention, it will normally not be desirable to utilize less than 10 milligrams or more than 100 milligrams of the 2-mercaptoimidazole compound per 100 pounds of body weight per 24 hours.

As described in Patent 2,751,303, the amount of estrogen employed in the feed ration for the beef cattle and sheep can vary while still obtaining a significant growth response without undesirable side effects. The preferred dosage for both beef cattle and sheep, as set out in said patent, will usually fall within the range from .1 to 3 milligrams of diethylstilbestrol per 100 pounds of body weight per 24 hours (or an equivalent amount of other estrogenic substances). In any event, the dosage should not exceed 8 milligrams for beef cattle and 5 milligrams for sheep on the basis of diethylstilbestrol per 100 pounds of body weight per 24 hours.

In practicing the present invention, it will be convenient to feed the estrogen and the 2-mercaptoimidazole compound as ingredients in a beef cattle or sheep protein feed supplement. Such supplements are commonly fed to beef cattle in amounts of one or two pounds per day. Sheep may receive one-fifth to one-fourth pound per day. Depending somewhat on the amount fed, such protein feed supplements can contain from 3–20 milligrams of diethylstilbestrol per pound and from 150 to 1000 milligrams of the 2-mercaptoimidazole compound per pound. If desired the estrogen and the 2-mercaptoimidazole compound can be included in a complete ration for the beef cattle or sheep. Usually the dosages can be computed with sufficient accuracy on the assumption that the animals will eat about 3% of their weight per day.

The following examples illustrate the method and feed compositions of this invention in greater detail.

*Example I*

10 grams of diethylstilbestrol is dissolved in 227 grams of soybean oil. The oil solution of the estrogen is then thoroughly mixed with 8.5 pounds of dry, oil-free soybean meal. The resulting material is next thoroughly mixed and blended with 500 grams of 1-methyl-2-mercaptoimidazole which is in the form of a fine dry powder. When the 2-mercaptoimidazole compound has been distributed throughout the soybean meal material, the resulting premix product will contain 50 grams of the 2-mercaptoimidazole compound and 1 gram of diethylstilbestrol per pound of the product.

The premix product prepared as described above (which contains both the diethylstilbestrol and the 1-methyl-2-mercaptoimidazole in the proportions of 50 parts of the 2-mercaptoimidazole compound per part of the diethylstilbestrol) can then be used to prepare a feed ration or protein supplement for administration to beef cattle. For example, 10 pounds of the premix can be mixed with 1,990 pounds of a beef cattle protein supplement. Such supplements are composed principally of a high protein component from a vegetable source such as soybean meal, cotton seed meal, linseed meal, wheat bran, etc. After the premix has been thoroughly distributed throughout the protein supplement, a ton of a feed material utilizable in accordance with the present invention will be obtained. This material will contain 5 milligrams of diethylstilbestrol per pound and 250 milligrams of 1-methyl-2-mercaptoimidazole per pound, and is well adapted for use as finishing-type protein supplement in the feeding of beef cattle for market.

*Example II*

In practicing the method of this invention it is preferred to utilize steers, although the method is also applicable to heifers. By way of specific example, yearling steers weighing an average of 700 pounds can first be fed for ninety days on a ration which includes approximately 10 milligrams of diethylstilbestrol per day per animal. At the end of that period the steers have average weights of say 950 pounds. At this point, the feeding of the finishing ration will be started. This ration will include the special protein supplement described in Example I, which will be fed at the rate of 2 pounds per day per animal for a further period of sixty days. This will means that the animals will be receiving approximately 10 milligrams of diethylstilbestrol and 500 milligrams of 1-methyl-2-mercaptoimidazole per 24 hours. The rate of weight gain and the feed efficiency will be substantially higher during this 60 day period than in the preceding 90 day period when the diethylstilbestrol was employed alone. The weights of the animals at the end of the final 60 day feeding period might average around 1150 to 1200 pounds.

*Example III*

A protein feed supplement is prepared as described in Example I except that the quantity of diethylstilbestrol is doubled. The resulting feed material will then contain 10 milligrams of diethylstilbestrol and 250 milligrams of 1-methyl-2-mercaptoimidazole per pound. This protein supplement is then used in the feeding of sheep. By way of specific example, feeder lambs having an average weight of around 70 pounds at the start can be fed a ration including 0.2 pound of the supplement per day over a 60 day feeding period. The lambs would then be receiving approximately 2 milligrams of diethylstilbestrol and 50 milligrams of 1-methyl-2-mercaptoimidazole per 24 hours. At the end of the 60 day feeding period the lambs would have an average weight of say 100 pounds, and would be ready for marketing.

While in the foregoing specification this invention has been described in considerable detail and specific embodiments thereof have been set forth, it will be apparent to those skilled in the art that this invention is subject to other embodiments and that many of the details set forth can be varied considerably without departing from the basic principles of the invention.

We claim:

1. In the method of promoting the growth and feed-utilization of beef cattle wherein said beef cattle are fed a first ration containing a synthetic estrogen, the improvement comprising feeding said beef cattle a second ration following the feeding of said first ration, said second ration being like said first ration in that it also contains a synthetic estrogen but differing from said first ration by containing a 2-mercaptoimidazole compound selected from the group consisting of 2-mercaptoimidazole and 1-alkyl 2-mercaptoimidazoles wherein the said alkyl group contains from 1 to 5 carbon atoms, the weight ratio of said estrogen and said 2-mercaptoimidazole compound in said second ration being such that there are from 10 to 100 weight units of said 2-mercaptoimidazole compound per each part of said estrogen corresponding in estrogenic activity to 1 weight unit of diethylstilbestrol.

2. The method of claim 1 wherein said estrogen is diethylstilbestrol and wherein said 2-mercaptoimidazole compound is 1-methyl 2-mercaptoimidazole.

3. In the method of promoting the growth and feed utilization of meat-producing ruminants wherein said ruminants are fed a first ration containing a synthetic estrogen, the improvement comprising feeding said ruminants a second ration following the feeding of said first ration, said second ration being like said first ration in that it also contains a synthetic estrogen but differing from said first ration by containing a 2-mercaptoimidazole compound selected from the group consisting of 2-mercaptoimidazole and 1-alkyl 2-mercaptoimidazoles wherein the said alkyl group contains from 1 to 5 carbon atoms, the weight ratio of said estrogen and said 2-mercaptoimidazole compound in said second ration being such that there are from 10 to 100 weight units of said 2-mercaptoimidazole compound per each part of said estrogen corresponding in estrogenic activity to 1 weight unit of diethylstilbestrol.

4. The method of claim 3 wherein said estrogen is diethylstilbestrol and wherein said 2-mercaptoimidazole compound is 1-methyl 2-mercaptoimidazole.

5. A composition for promoting the growth and feed utilization of meat-producing ruminants, comprising in combination a ruminant feed material, an estrogenic substance and a 2-mercaptoimidazole compound selected from the group consisting of 2-mercaptoimidazole and 1-alkyl 2-mercaptoimidazoles wherein the said alkyl group contains from 1 to 5 carbon atoms, the weight ratio of said estrogenic substance and said 2-mercaptoimidazole compound in said combination being such that there are from 10 to 100 weight units of said 2-mercaptoimidazole compound per each part of said estrogenic substance corresponding in estrogenic activity to 1 weight unit of diethylstilbestrol.

6. The composition of claim 5 wherein said estrogenic substance is diethylstilbestrol and wherein said 2-mercaptoimidazole compound is 1-methyl 2-mercaptoimidazole.

References Cited in the file of this patent

UNITED STATES PATENTS

| | | |
|---|---|---|
| 2,456,515 | Kamlet | Dec. 14, 1948 |
| 2,751,303 | Burroughs | June 19, 1956 |
| 2,881,112 | Mattox | Apr. 7, 1959 |
| 2,977,230 | Brent | Mar. 28, 1961 |

OTHER REFERENCES

Blair, Jr.: Animal Science 17 (August 1958), pages 851–861.

Feedstuffs, vol. 31, January 10, 1959, page 31.